United States Patent

[11] 3,592,144

| [72] | Inventor | James C. Futrell |
| | | 1007 Drake St., Roanoke Rapids, N.C. |
| [21] | Appl. No | 866,856 |
| [22] | Filed | Oct. 16, 1969 |
| [45] | Patented | July 13, 1971 |

[54] UTILITY TABLE FOR AUTOMOBILES
6 Claims, 7 Drawing Figs.

[52] U.S. Cl. ............................................. 108/44
[51] Int. Cl. ....................................... A47b 37/00
[50] Field of Search .................................. 108/44, 47,
150, 6, 9, 45; 248/188.2, 188.3, 158, 398, 411, 451

[56] References Cited
UNITED STATES PATENTS

| 607,546 | 7/1898 | Milner | 248/398 |
| 791,268 | 5/1905 | Jameson | 248/398 |
| 2,807,908 | 10/1957 | Lykes | 248/451 |
| 3,391,960 | 7/1968 | Megargle et al. | 108/44 |

FOREIGN PATENTS

| 571,939 | 9/1945 | Great Britain | 108/44 |

Primary Examiner—Bobby R. Gay
Assistant Examiner—Darrell Marquette
Attorneys—A. Yates Dowell and A. Yates Dowell, Jr.

ABSTRACT: The invention is a utility table for use in an automobile, with such table having a base which may be curved to fit over the rounded cover for the shaft housing of the automobile ahead of the seat. A mounting member is swingably carried by the base and is provided with means for securing it in a definite position. A post with a tabletop at a slight angle at its upper end is detachably carried by the mounting member so that when in upright position the tabletop will be at a slight angle and by swinging the post and mounting member rearwardly the table top will be disposed at a greater angle but by swinging the post forwardly the tabletop can be disposed horizontally. By reversing the post and tabletop on the mounting member, the table top can be similarly disposed but in its rearmost position will extend farther over the seat.

PATENTED JUL 13 1971
3,592,144
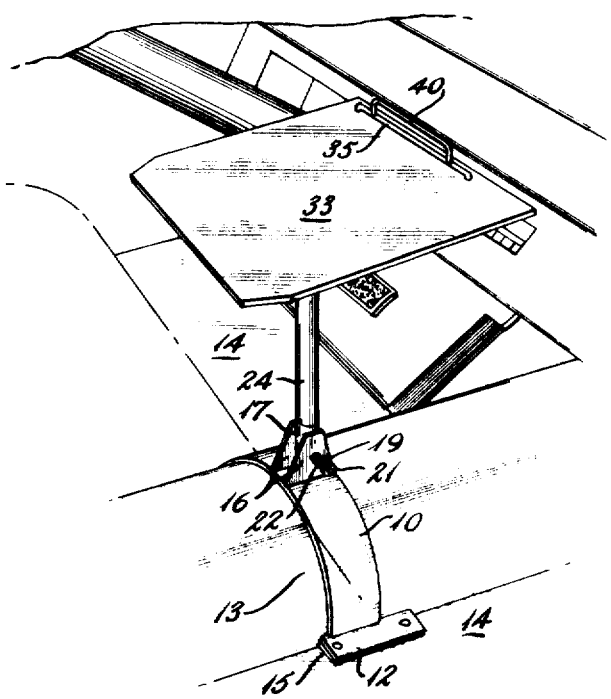
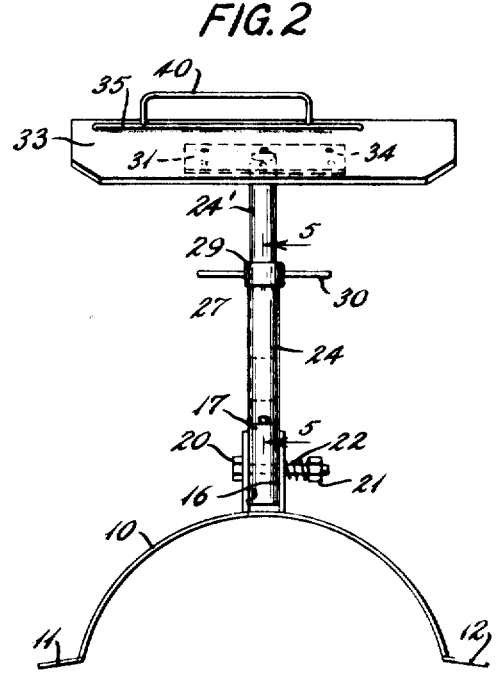
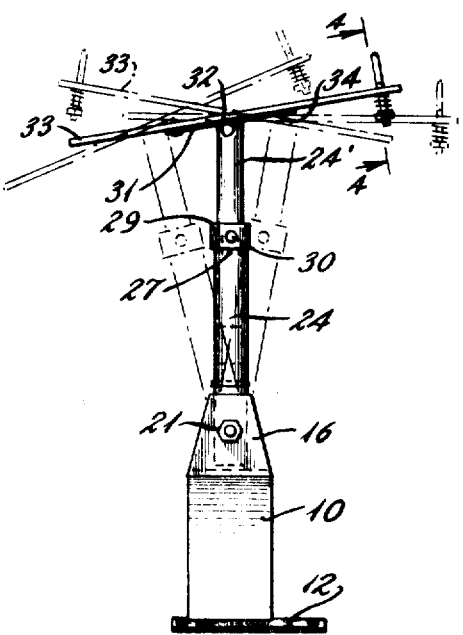
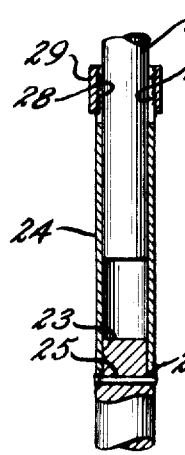
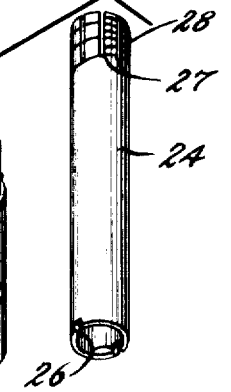
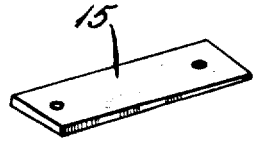
INVENTOR
JAMES C. FUTRELL
BY
ATTORNEYS

3,592,144

UTILITY TABLE FOR AUTOMOBILES

BACKGROUND OF THE INVENTION

1. Field of the Invention

The invention is in the field of automobile accessories, particularly tables used for various purposes including as a support for food, for writing, card playing, and the like.

2. Description of the Prior Art

Numerous accessories have been provided for automobiles, including holders or receptacles for various articles, including tables and the like, some of which rest upon or are bolted to the floor, as in U.S. Pat. No. 3,391,960 and British Pat. No. 571,939 of 1945. However, prior art devices have failed to provide a table with a base which will fit over the cover for the shaft housing of an automobile and which table can be adjusted in height and its top disposed in multiple inclined and horizontal positions.

SUMMARY OF THE INVENTION AND OBJECTS

The table of the present invention has a base curved to fit over the cover for the shaft housing of an automobile ahead of the seat. It includes shims by which it may be solidly supported on the floor and anchored in place. Attached to the base is a pivoted mounting, frictionally secured so that it may be angularly adjusted. A mounting post comprised of telescopic members has a tabletop angularly disposed at its upper end, and its lower end is complementary to said mounting so that when the post is attached to the mounting it can be disposed in horizontal or different angular positions, or it may be revolved and disposed in additional angular positions. The post is comprised of telescopic members with the receiving member having a threaded, longitudinally slotted end for reception of a clamping nut to secure the parts in lengthwise adjusted relation but permitting rotary adjustment in any desired position.

It is an object of the invention to provide a simple, inexpensive, readily manufactured utility table for use in an automobile or elsewhere and having a base curved to fit readily over the cover for the shaft housing of the automobile, with a readily mountable and demountable post or support for mounting an angularly attached tabletop at different elevations and by the swinging of the post the tabletop may be disposed either horizontally or angularly as desired, and with the tabletop provided with means for yieldably holding paper or other articles thereon.

BRIEF DESCRIPTION OF THE DRAWING

FIG. 1 is a perspective illustrating one application of the invention;

FIG. 2, a front elevation;

FIG. 3, a side elevation of the device with the post and tabletop in multiple angular positions and the tabletop in different angular and horizontal positions;

FIG. 4, a section of the holder on the line 4—4 of FIG. 3;

FIG. 5, an enlarged fragmentary detail of the post and its mounting;

FIG. 6, an exploded view of the lower post member and support; and

FIG. 7, a perspective of a shim or templet.

DESCRIPTION OF THE PREFERRED EMBODIMENT

The table of the present invention includes a curved base 10 in the form of a strip of metal having elongated, perforated attaching portions 11 and 12 by means of which the base may be fitted over the cover 13 for the housing of the shaft of the automobile and anchored to the floor 14. Shims 15 may be provided in order to obtain a solid connection between the attaching portions 11 and 12 and the floor 14.

The base 10 is provided at its upper central portion with a pair of upstanding lugs 16 between which is disposed a mounting member 17, such mounting member having an opening 18, and the lugs having openings 19 in which is received a spring bolt 20 having a nut 21 and a confined spring 22. Thus the nut can be tightened to increase the pressure on the spring 22 and to move the lugs 16 toward each other to cause them to bind against the mounting member 17.

The upper end of the mounting member is provided with a reduced portion 23 over which is adapted to be telescoped the lower end of a pipe or post 24 so that such post can be readily attached and removed. The mounting member 17 and the post 24 are provided with complementary pin and slot portions 25 and 26 respectively. Thus the post can be readily removed and replaced in one of two positions 180° apart.

The upper end of the post 24 is provided with longitudinal slots 27 and with threads 28 for the reception of a clamping nut 29 for securing the post members 24 and 24' in fixed relation. The nut 29 has outwardly extending manipulating arms 30 to facilitate the tightening and loosening of the nut about a smaller post section 24' which extends into the larger post member 24. It will be readily understood that the upper end of the post may be in upright position or may be inclined rearwardly or forwardly relative to its lower end mounted on the pivot bolt 20.

On the upper end of the pipe or post member 24' is secured a steel plate 31 by means of welds 32, and this plate is used as a mounting for the tabletop 33, preferably of plywood or the like, and may be secured thereto by fasteners 34. When the post is in upright position, the tabletop will be slightly inclined, as illustrated, and by swinging the post rearwardly the inclination will be increased, while by swinging it in the opposite direction or forwardly it will be substantially horizontal.

In order to hold writing paper or the like on the tabletop, a holder is provided in the form of a bar 35 having right-angular threaded end portions 36 which extend through openings 37 in the tabletop. On the threaded end portions 36 are nuts 38 which confine coil springs 39 between such nuts and the underside of the table, thus tending to maintain the bar 35 and any paper thereunder against the tabletop due to the action of the springs 39. In order to lift this bar, a handle or U-shaped operating member 40 extends upwardly from the bar so that the bar can be readily raised to insert paper thereunder for frictional holding by the bar.

It will be readily understood from the foregoing that a utility table is provided which can be readily installed in an automobile and disposed in different angular positions for different uses.

I claim:

1. A utility table for automobiles comprising a base mountable on the floor of an automobile, an angularly adjustable mounting portion on said base, said mounting portion including an upper extremity of reduced diameter, a transversely extending pin projecting through said upper extremity of reduced diameter at the bottom thereof, a telescopic post for detachable engagement with said upper extremity of said mounting portion, the lower extremity of said telescopic post being provided with opposed slots for engagement with the extremities of said transversely extending pin to prevent rotative movement of said telescopic post, a tabletop mounted at an angle of said telescopic post, means whereby said mounting portion can be secured in upright position with the post upright and the tabletop slightly inclined, can be moved rearwardly for increasing the inclination of the tabletop, and can be moved forwardly to dispose the tabletop in substantially horizontal position, said telescopic post being selectively engageable with said transverse pin in one of two positions which are 180° apart thereby to determine initially the angular direction of the tabletop, the construction and arrangement being such that the telescopic post and tabletop may be lifted freely from the mounting portion and removed when not in use without disturbing the mounting member.

2. A utility table of the kind set forth in claim 1 in which the mounting portion is frictionally held for easy change of position of the tabletop.

3. The structure of claim 1 in which said post is of adjustable length, and with means for securing the same adjusted as to length.

4. The structure of claim 1 in which said post is formed of telescopic members with clamping means for fastening them in fixed relation.

5. The structure of claim 1 in which the post has overlapping members, and means for securing said members in fixed relation but releasable to allow adjustment of one relative to the other.

6. The structure of claim 1 in which said tabletop includes tension means thereon for holding articles.